(12) United States Patent
Tanaka

(10) Patent No.: US 10,168,350 B2
(45) Date of Patent: Jan. 1, 2019

(54) PHYSICAL QUANTITY SENSOR, PHYSICAL QUANTITY SENSOR DEVICE, ELECTRONIC APPARATUS, AND MOVING OBJECT

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 209 days.

(21) Appl. No.: 15/187,175

(22) Filed: Jun. 20, 2016

(65) Prior Publication Data
US 2017/0010298 A1 Jan. 12, 2017

(30) Foreign Application Priority Data
Jul. 10, 2015 (JP) ................. 2015-138480

(51) Int. Cl.
*G01P 15/125* (2006.01)
(52) U.S. Cl.
CPC .................. *G01P 15/125* (2013.01)
(58) Field of Classification Search
CPC .................................................. G01P 15/125
See application file for complete search history.

(56) References Cited

U.S. PATENT DOCUMENTS

| | | | | |
|---|---|---|---|---|
| 5,983,721 A * | 11/1999 | Sulzberger | ............ | B81B 3/0072 361/280 |
| 6,915,693 B2 * | 7/2005 | Kim | ................... | G01C 19/5762 73/504.12 |
| 6,952,965 B2 * | 10/2005 | Kang | .................... | B81B 3/0059 73/504.02 |
| 7,322,242 B2 | 1/2008 | Merassi et al. | | |
| 8,207,586 B2 | 6/2012 | Sato et al. | | |
| 9,109,893 B2 * | 8/2015 | Heller | .................... | G01C 19/56 |
| 9,719,784 B2 * | 8/2017 | Heller | ................ | G01C 19/5712 |
| 2004/0149035 A1 * | 8/2004 | Acar | ..................... | B81B 3/0062 73/504.12 |
| 2012/0073370 A1 | 3/2012 | Schubert et al. | | |
| 2012/0111615 A1 * | 5/2012 | Yoda | .................... | G01P 15/0802 174/257 |
| 2013/0042685 A1 * | 2/2013 | Yoda | ................... | G01P 15/0802 73/514.16 |
| 2013/0220016 A1 * | 8/2013 | Simoni | ............... | B81C 1/00198 73/514.32 |

(Continued)

FOREIGN PATENT DOCUMENTS

| | | |
|---|---|---|
| CN | 102 449488 A | 5/2012 |
| JP | 10-111312 A | 4/1998 |

(Continued)

*Primary Examiner* — Natalie F Huls
(74) *Attorney, Agent, or Firm* — Harness, Dickey & Pierce, P.L.C.

(57) ABSTRACT

A physical quantity sensor includes an element piece, in which the element piece includes a support portion that includes a first support portion, a second support portion, and a third support portion that links the first and second support portions, and is connected to a base substrate at the third support portion, a movable electrode portion that is positioned between the first and second support portions, and includes a movable electrode finger, an elastic portion that links the movable electrode portion and the support portion and has elasticity, and a fixed electrode portions having fixed electrode fingers that are arranged facing the movable electrode finger.

19 Claims, 12 Drawing Sheets

(56) References Cited

U.S. PATENT DOCUMENTS

| | | | |
|---|---|---|---|
| 2013/0255382 A1* | 10/2013 | Tanaka | G01P 15/125 73/514.32 |
| 2013/0256814 A1* | 10/2013 | Tanaka | B81B 3/0021 257/415 |
| 2013/0263662 A1* | 10/2013 | Tanaka | G01P 1/003 73/504.12 |
| 2015/0059474 A1* | 3/2015 | Tanaka | G01P 15/125 73/514.32 |
| 2016/0047838 A1* | 2/2016 | Tanaka | G01P 15/125 73/514.32 |
| 2016/0047839 A1* | 2/2016 | Tanaka | G01P 15/125 73/514.32 |
| 2016/0054353 A1* | 2/2016 | Tanaka | B81C 1/00357 73/514.32 |
| 2016/0061858 A1* | 3/2016 | Tanaka | G01P 15/131 73/514.18 |
| 2016/0103149 A1* | 4/2016 | Sakai | G01P 15/0802 73/1.38 |
| 2016/0209442 A9* | 7/2016 | Tanaka | G01P 15/125 |
| 2016/0282382 A1* | 9/2016 | Jeanroy | G01P 15/097 |
| 2017/0010295 A1* | 1/2017 | Kigure | G01P 15/125 |
| 2017/0199217 A1* | 7/2017 | Naruse | B81B 7/04 |
| 2018/0038888 A1* | 2/2018 | Tanaka | G01C 19/5769 |
| 2018/0067144 A1* | 3/2018 | Tanaka | G01P 15/125 |

FOREIGN PATENT DOCUMENTS

| | | |
|---|---|---|
| JP | 2010-071911 A | 4/2010 |
| JP | 2014-115080 A | 6/2014 |

* cited by examiner

PHYSICAL QUANTITY SENSOR, PHYSICAL QUANTITY SENSOR DEVICE, ELECTRONIC APPARATUS, AND MOVING OBJECT

BACKGROUND

1. Technical Field

The present invention relates to a physical quantity sensor, a physical quantity sensor device, an electronic apparatus, and a moving object.

2. Related Art

For example, JP-A-2010-71911 discloses a MEMS sensor having an insulating substrate and an element piece bonded to the insulating substrate. The element piece includes a fixed electrode portion having a fixed electrode finger and a movable electrode portion having a movable electrode finger that faces the fixed electrode finger. The movable electrode portion includes first and second support conducting portions that are bonded to the insulating substrate, first and second support arm portions that extend from the first and second support conducting portions, and a weight portion that is linked to the first and second support arm portions via an elastic portion and provided with the above-described movable electrode finger.

In such a configuration, because the movable electrode portion is bonded to the insulating substrate at two locations (first and second support conducting portions) as described above, problems arise where there is significant influence from warping of the insulating substrate due to thermal expansion, the electrostatic capacitance between the movable electrode finger and the fixed electrode finger changes, and the detection precision of acceleration is lowered.

SUMMARY

An advantage of some aspects of the invention is to provide a physical quantity sensor, a physical quantity sensor device, an electronic apparatus, and a moving object with superior detection precision of a physical quantity.

The invention can be realized in the following aspects or application examples.

Application Example 1

According to this application example, there is provided a physical quantity sensor, including a substrate; and an element piece bonded to the substrate, in which the element piece includes a support portion having a first support portion, a second support portion arranged separated from the first support portion in the first direction, and a third support portion linked to the first support portion and the second support portion that is connected to the substrate with the third support portion, a movable electrode portion that is positioned between the first support portion and the second support portion, is arranged aligned with the third support portion in a second direction orthogonal to the first direction, and that has a movable electrode finger, an elastic portion having a first elastic portion that is positioned between the movable electrode portion and the first support portion, and links the movable electrode portion and the first support portion, and a second elastic portion that is positioned between the movable electrode portion and the second support portion and that links the movable electrode portion and the second support portion, and that makes the movable electrode portion displaceable in the first direction with respect to the support portion, and a fixed electrode portion that is connected to the substrate and has a fixed electrode finger arranged facing the movable electrode finger.

In this way, the influence (in particular changes in the separation distance between the fixed electrode finger and the movable electrode finger and changes in the opposing areas of the fixed electrode finger and the movable electrode finger) of the warping of the substrate due to heat or external stress can be reduced by connecting to the substrate via the third support portion. Because the first elastic portion and the second elastic portion are positioned on the outside of the movable electrode portion, unnecessary displacement other than displacement in the first direction of the movable electrode portion (such as, displacement in the second direction, displacement in the height direction, and displacement in the rotation direction) can be reduced. Therefore, the physical quantity sensor has superior detection precision of a physical quantity.

Application Example 2

In the physical quantity sensor of the application example, it is preferable that the support portion further includes a fourth support portion that is positioned on a side opposite to the third support portion with the movable electrode portion interposed, and links the first support portion and the second support portion.

In so doing, the rigidity of the support portion can be increased and the movable electrode portion can be more stably supported.

Application Example 3

In the physical quantity sensor of the application example, it is preferable that, in plan view of the substrate, the third support portion is positioned further to the center side of the substrate than the fourth support portion.

The influence (in particular changes in the separation distance between the fixed electrode finger and the movable electrode finger and changes in the opposing areas of the fixed electrode finger and the movable electrode finger) of the warping of the substrate due to heat or external stress can be further reduced by how close the part at which connection is performed is to the center of the substrate.

Application Example 4

In the physical quantity sensor of the application example, it is preferable that the support portion is connected to the substrate at the central portion except for both ends of the third support portion in the first direction.

In so doing, because the fixed portion with the substrate of the support portion can be better separated from the movable electrode portion, the influence (in particular changes in the separation distance between the fixed electrode finger and the movable electrode finger and changes in the opposing areas of the fixed electrode finger and the movable electrode finger) of the warping of the substrate due to heat or external stress can be reduced.

Application Example 5

In the physical quantity sensor of the application example, it is preferable that the support portion is connected to the substrate at a region that overlaps onto a first virtual line of the third support portion, when, in plan view of the element piece, the first virtual line that passes through the center of the movable electrode portion and extends along the second direction is set.

In so doing, because the fixed portion with the substrate of the support portion can be better separated from the movable electrode portion, the influence (in particular changes in the separation distance between the fixed electrode finger and the movable electrode finger and changes in the opposing areas of the fixed electrode finger and the movable electrode finger) of the warping of the substrate due to heat or external stress can be reduced. The movable electrode portion can be more stably supported.

Application Example 6

In the physical quantity sensor of the application example, it is preferable that the connection portion with the substrate of the fixed electrode portion is positioned further to the third support portion side than a second virtual line, when, in plan view of the element piece, the second virtual line that passes through the center of the movable electrode portion and extends along the first direction is set.

In so doing, the connection portion between the third support portion and the substrate and the connecting portion between the fixed electrode portion and the substrate can be brought close. Therefore, the influence (in particular changes in the separation distance between the fixed electrode finger and the movable electrode finger and changes in the opposing areas of the fixed electrode finger and the movable electrode finger) of the warping of the substrate due to heat or external stress can be reduced.

Application Example 7

According to this application example, there is provided a physical quantity sensor device, including the physical quantity sensor of the above-described application examples and an electronic component electrically connected to the physical quantity sensor.

In so doing, a physical quantity sensor device with superior reliability is obtained.

Application Example 8

According to this application example, there is provided an electronic apparatus including the physical quantity sensor of the above-described application examples.

In so doing, an electronic apparatus with superior reliability is obtained.

Application Example 9

According to this application example, there is provided a moving object including the physical quantity sensor of the above-described application examples.

In so doing, a moving object with superior reliability is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, the physical quantity sensor, the physical quantity sensor device, the electronic apparatus, and the moving object of the invention will be described in detail based on embodiments illustrated in the attached drawings.

First Embodiment

Figure 1:
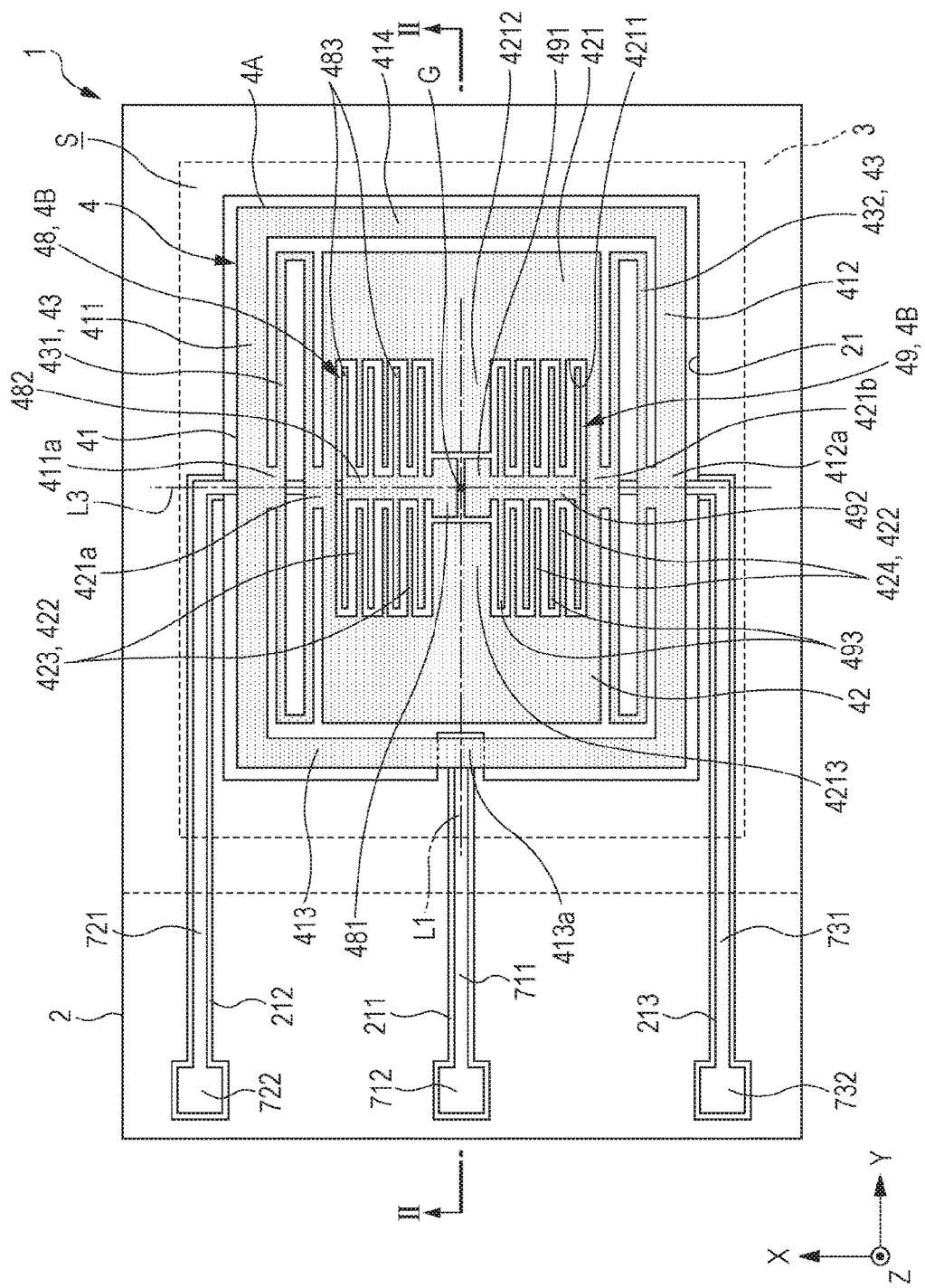
FIG. 1 is a plan view of a physical quantity sensor according to a first embodiment of the invention.
Figure 2:
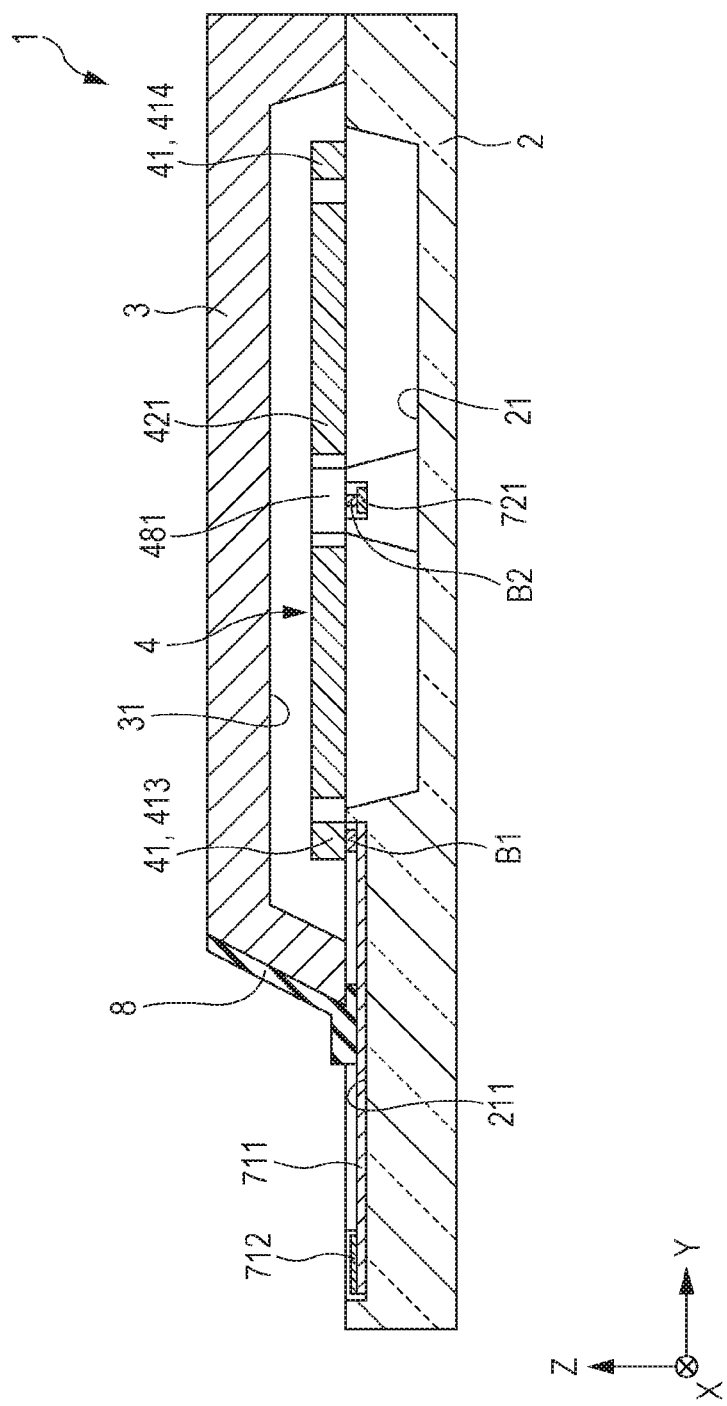
FIG. 2 is a cross-sectional view taken along the line II-II in FIG. 1.
Figure 3:
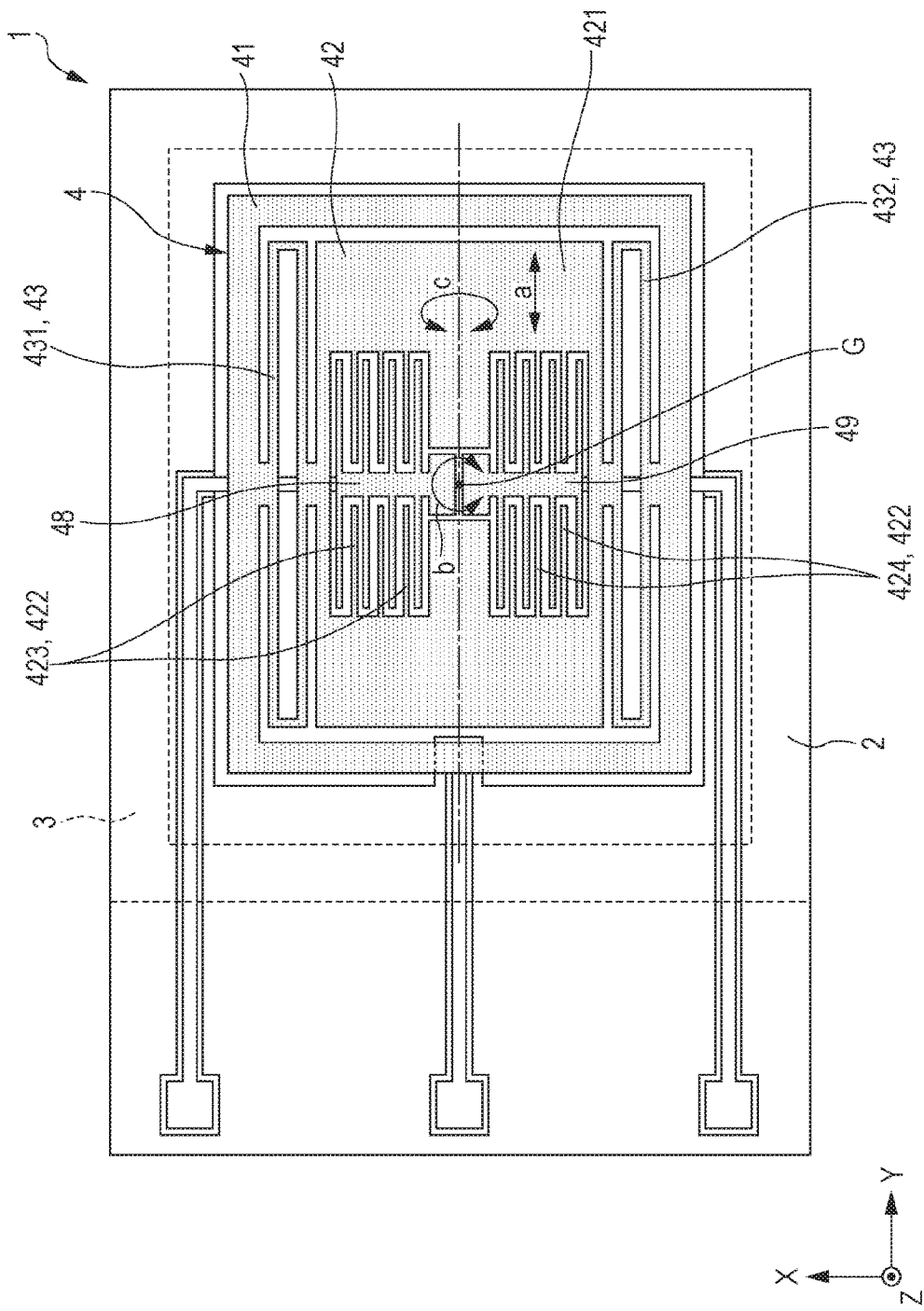
FIG. 3 is a plan view illustrating unnecessary vibration.
Figure 4:
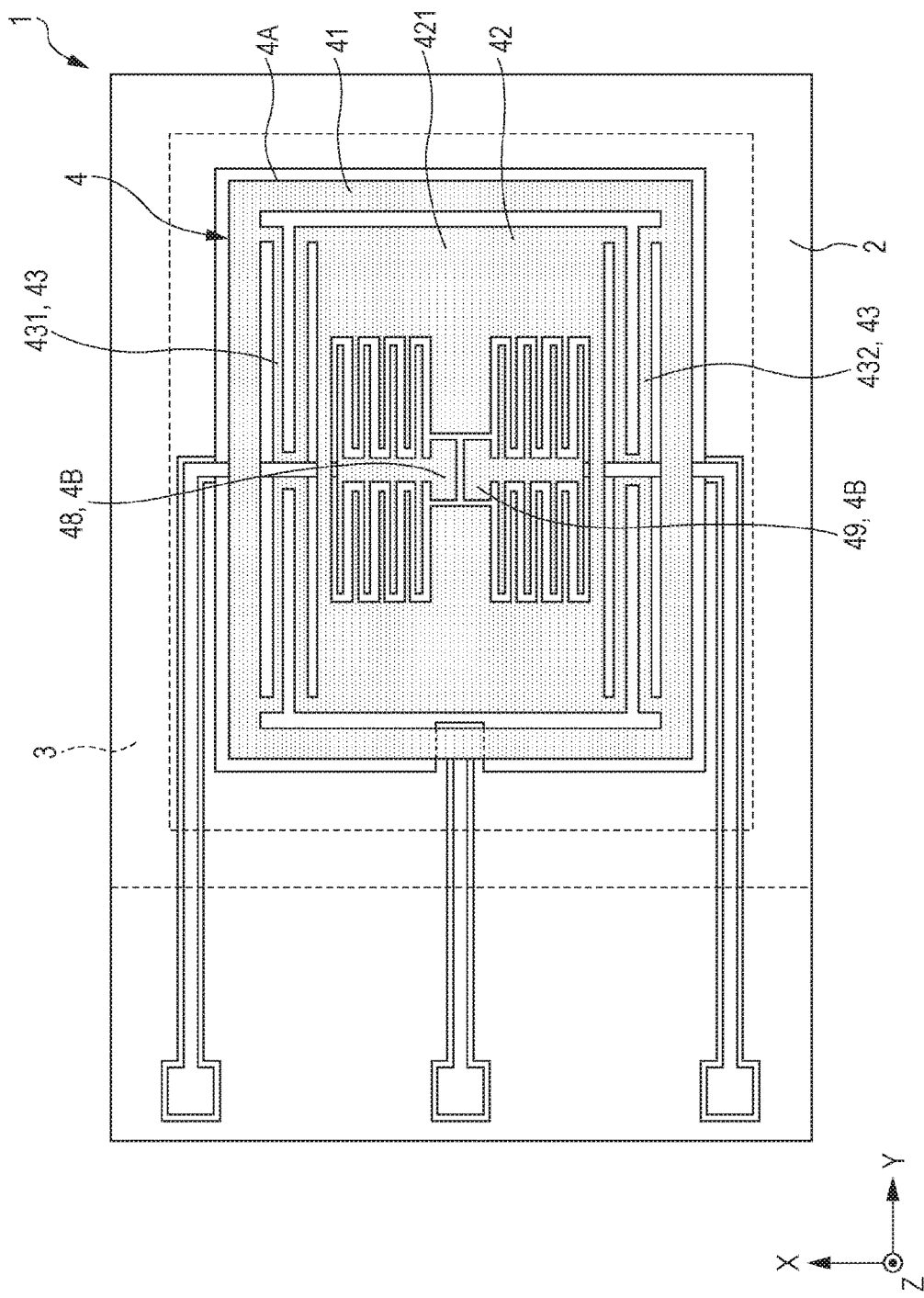
FIG. 4 is a plan view illustrating a modification example of an elastic portion.
Figure 5:
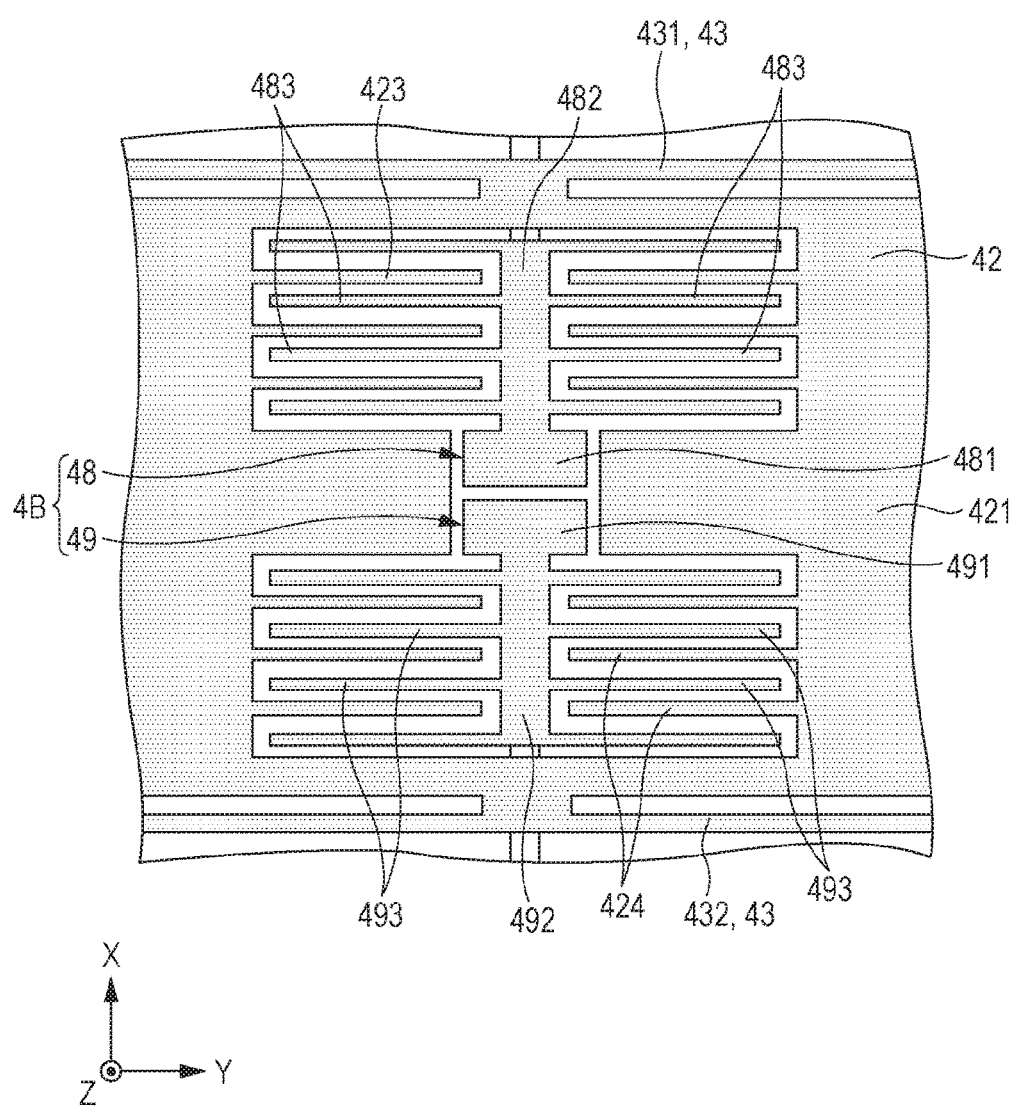
FIG. 5 is an expanded plan view of an element piece that includes the physical quantity sensor of FIG. 1.
Figure 6:
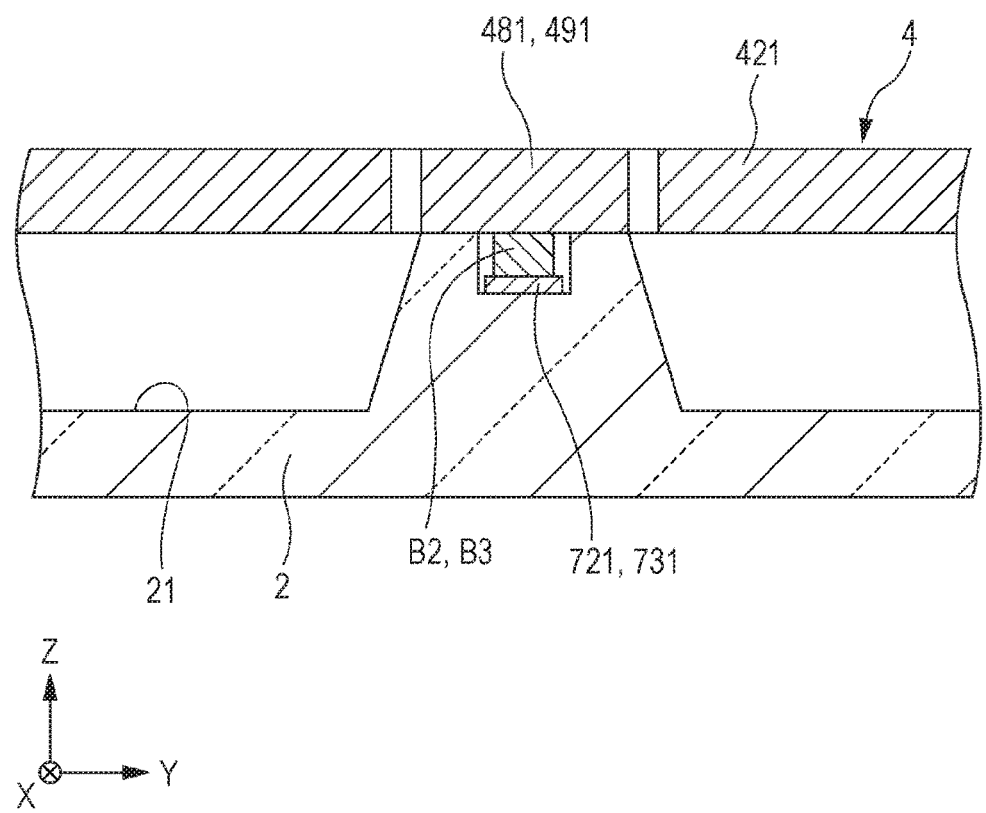
FIG. 6 is a cross-sectional view of the element piece illustrated in FIG. 5.
Figure 7:
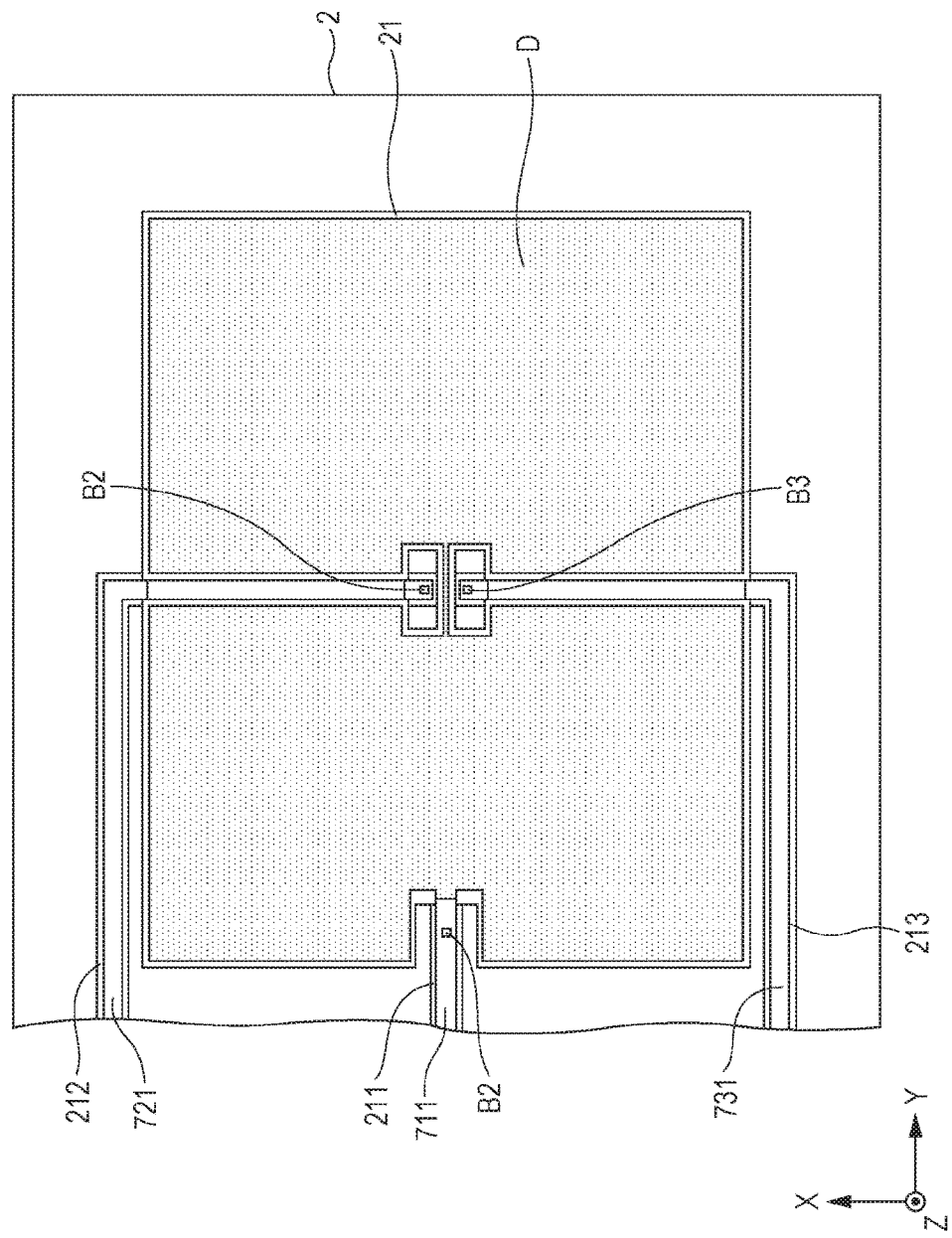
FIG. 7 is a plan view illustrating a concave portion of the base substrate included in the physical quantity sensor of FIG. 1.

FIG. 1 is a plan view of a physical quantity sensor according to the first embodiment of the invention. FIG. 2 is a cross-sectional view taken along the line II-II in FIG. 1. FIG. 3 is a plan view illustrating unnecessary vibration. FIG. 4 is a plan view illustrating a modification example of the elastic portion. FIG. 5 is an expanded plan view of an element piece included in the physical quantity sensor in FIG. 1. FIG. 6 is a cross-sectional view of the element piece illustrated in FIG. 5. FIG. 7 is a plan view illustrating a concave portion of the base substrate included in the physical quantity sensor in FIG. 1.

Below, for ease of description, the sheet surface forward side in FIG. 1 (upper side in FIG. 2) will be referred to as "up" and the sheet surface interior side (lower side in FIG. 2) as "down". In each drawing, the X-axis, the Y-axis, and the Z-axis are depicted as three mutually orthogonal axes. Below, the direction parallel to the X-axis is also referred to as the "X-axis direction", the direction parallel to the Y-axis as the "Y-axis direction" and the direction parallel to the Z-axis as the "Z-axis direction". The plane that includes the X-axis and the Y-axis is also referred to as the "XY plane".

The physical quantity sensor 1 illustrated in FIGS. 1 and 2 is able to be used as an acceleration sensor for measuring acceleration in the X-axis direction (in-plane direction). Such a physical quantity sensor 1 includes a base substrate (substrate) 2, a lid 3, and an element piece arranged in the internal space S formed by the base substrate and the lid. Such a physical quantity sensor 1 is configured so that, when acceleration is imparted in the X-axis direction, the electrostatic capacitance formed in the element piece 4 changes and the imparted acceleration is detected based on this change in electrostatic capacitance.

Below, the base substrate 2, the lid 3, and the element piece 4 will be described in this order.

Base Substrate

A concave portion 21 that opens to the upper surface is formed in the base substrate 2. The concave portion 21 functions as an escape portion for preventing contact between the element piece 4 and the base substrate 2. Concave portions 211, 212, and 213 that open to the upper surface and are arranged so as to follow the outer periphery of the concave portion 21 are formed in the base substrate 2. A wiring 711 and a terminal 712 are formed in the concave portion 211, a wiring 721 and a terminal 722 are formed in the concave portion 212, and a wiring 731 and a terminal 732 are formed in the concave portion 213. Each terminal 712, 722, and 732 are arranged so as to be exposed from the lid 3, and are able to be electrically connected to the outside (for example, an IC chip 102, described later).

Such a base substrate 2 is formed from a glass material (for example, a borosilicate glass such as Pyrex glass (registered trademark)) that contains alkali metal ions (mobile ions). In so doing, it is possible for the element piece 4 formed from a silicon substrate to be strongly bonded to the base substrate 2 through an anode bonding. Here, the constituent material of the base substrate 2 is not limited to a glass material, and it is possible to use a high resistance silicon material. In this case, it is possible for bonding to the element piece 4 to be performed via a resin-based adhesive, a glass paste, a metal film or the like.

Element Piece

The element piece 4 is bonded (connected) to the upper surface of the base substrate 2 as illustrated in FIGS. 1 and 2. The element piece 4 includes a first structure 4A having a part displaceable with respect to the base substrate 2 and a second structure 4B, the position of which is fixed with respect to the base substrate 2. Such an element piece 4 is formed from a silicon substrate doped with impurities such as phosphorous or boron. Specifically, it is possible for the element piece 4 to be formed by, for example, bonding the silicon substrate doped in advance with impurities to the upper surface of the base substrate 2 through anode bonding, next thinning the silicon substrate, as necessary, by chemical mechanical polishing (CMP) or the like, and next patterning the silicon substrate using a photolithography method and an etching method. However, the constituent material of the element piece 4 is not limited to silicon, and it is possible to use another semiconductor or the like.

First, the first structure 4A will be described. The first structure 4A is provided with a support portion 41, a movable electrode portion 42, and an elastic portion 43.

The support portion 41 is formed in a frame shape. Specifically, the support portion 41 includes a first support portion 411 that extends in the Y-axis direction, a second support portion 412 that is arranged separated in the X-axis direction from the first support portion 411 and that extends in the Y-axis direction, a third support portion 413 that links the end portions on the −Y-axis side of the first and second support portions 411 and 412 to one another, and that extends in the X-axis direction, and a fourth support portion 414 that links the end portions on the +Y-axis side of the first and second support portions 411 and 412 to one another, and that extends in the X-axis direction. In this way, by making the support portion 41 in a frame shape, it is possible for the rigidity of the support portion 41 to be increases, and to support the movable electrode portion 42 in a more stable posture. As long as the configuration of the support portion 41 is able to support the movable electrode portion 42, there is no limitation thereto, and, for example, a letter "C" shape in which the fourth support portion 414 is left out may be used.

Such a support portion 41 as illustrated in FIG. 1 is bonded (connected) and fixed to the base substrate 2 via a fixing region 413a positioned in the central portion (central portion excepting both end portions) in the extension direction of the third support portion 413, and is supported at one point on the base substrate 2. In the embodiment, the fixing region 413a is positioned so as to overlap a virtual line (first virtual line) L1 that passes through the center G of the movable electrode portion 42 and extends in a direction following the Y-axis direction in plan view seen from the Z-axis direction. The support portion 41, as illustrated in FIG. 2, is electrically connected to the wiring 711 via a conductive bump B1 in the fixing region 413a.

The movable electrode portion 42 is positioned on the inside of the support portion 41 (between the first support portion 411 and the second support portion 412). The movable electrode portion 42, as illustrated in FIG. 1, includes a base portion 421 and a plurality of movable electrode fingers 422 that extend from the base portion 421. The base portion 421 is formed in a frame shape having an opening 4211, and a plurality of movable electrode fingers 422 are provided so as to protrude inside the opening 4211.

The plurality of movable electrode fingers 422 include a plurality of first movable electrode fingers 423 that are positioned on one side (+X-axis side) with respect to the center G of the base portion 421, and a plurality of second movable electrode fingers 424 that are positioned on another side (−X-axis side). The first movable electrode fingers 423 and the second movable electrode fingers 424 are arranged to line up in the X-axis direction forming two rows in the Y-axis direction, respectively. The arrangement of the first and second movable electrode fingers 423 and 424 is not limited thereto.

The base portion 421 includes protrusions 4212 and 4213 that protrude between the first movable electrode fingers 423 and the second movable electrode fingers 424. By having such protrusions 4212 and 4213, it is possible to increase the mass of the base portion 421, possible to increase the effects of the weight of the movable electrode portion 42, the movable electrode portion 42 more precisely displaces according to the magnitude of acceleration.

Such a movable electrode portion 42 is linked to the support portion 41 via the elastic portion 43. The elastic portion 43 includes a first elastic portion 431 that is positioned between the movable electrode portion 42 and the first support portion 411, and that links the movable electrode portion 42 and the first support portion 411 and a second elastic portion 432 that is positioned between the movable electrode portion 42 and the second support portion 412, and that links the movable electrode portion 42 and the second support portion 412. The first and second elastic portions 431 and 432 have elasticity, and are capable of elastic deformation in the X-axis direction. Therefore, it is possible for the movable electrode portion 42 to displace in the X-axis direction with respect to the support portion 41 while causing the first and second elastic portions 431 and 432 to elastically deform.

In particular, in the embodiment, the first elastic portion 431 is linked to the end portion on the +X-axis side of the movable electrode portion 42 and the second elastic portion 432 is linked to the end portion on the −X-axis side of the movable electrode portion 42. That is, the movable electrode portion 42 is supported on both of the first and second elastic portions 431 and 432. Therefore, it is possible for the movable electrode portion 42 to be supported in a stable posture, and for the movable electrode portion 42 to be driven to vibrate more smoothly in the X-axis direction. Furthermore, it is possible to reduce the occurrence of unnecessary vibrations (for example, such as displacement in the Y-axis direction indicated by the arrow a in FIG. 3, displacement around the Y-axis indicated by the arrow b (see-saw vibration), and displacement around the center G indicated by the arrow c (rotational vibration)) other than the above-described driving vibrations (displacement in the X-axis direction). In this way, the physical quantity detection precision of the physical quantity sensor 1 is improved by the movable electrode portion 42 being able to smoothly displace in the X-axis direction and reducing the unnecessary vibrations of the movable electrode portion 42.

Furthermore, as illustrated in FIG. 1, when the virtual line L3 that follows the X-axis passing through the center G of the movable electrode portions 42, when seen in plan view from the Z-axis direction, is set, in the embodiment, the linking portion 421a with the first elastic portion 431 of the movable electrode portion 42 and the linking portion 421b of the second elastic portion 432 are each positioned on the virtual line L3. Therefore, it is possible to support the movable electrode portion 42 in a state where a balance in the weights on the left and right is achieved and more effectively, it is possible to reduce the unnecessary vibrations (in particular, displacement around the center G).

Furthermore, in the embodiment, the linking portion 411a with the first elastic portion 431 of the first support portion 411 and the lining portion 412a with the second elastic portion 432 of the second support portion 412 are each positioned on the virtual line L3. In this way, it is possible to distance the first elastic portion 431 and the second elastic portion 432 from the center G while holding the balance of the movable electrode portion 42, by arranging the linking portions 411a and 412a on the virtual line L3 in the same way as the linking portions 421a and 421b. Therefore, more effectively, it is possible to reduce unnecessary vibrations.

As long as the configuration of the elastic portion 43 is able to support the movable electrode portion 42 to be displaceable in the X-axis direction, there is no limitation to the above-described configuration. For example, a configuration as illustrated in FIG. 4 may be used.

Next, the second structure 4B will be described. The second structure 4B, as illustrated in FIG. 1, includes a first fixed electrode portion 48 and a second fixed electrode portion 49. The first and second fixed electrode portions 48 and 49 are arranged on the inside (in the opening 4211) of the movable electrode portion 42. In this way, it is possible to achieve size reductions (in particular, to suppress planar spreading) in the physical quantity sensor 1 by arranging the first and second fixed electrode portions 48 and 49 on the inside of the movable electrode portion 42, respectively.

The first fixed electrode portion 48, as illustrated in FIG. 5, includes a fixed portion 481 bonded (connected) and fixed to the base substrate 2, a support beam portion 482 that extends in the +X-axis direction from the fixed portion 481 passing between the first movable electrode fingers 423 lined up in the Y-axis direction, and a plurality of first fixed electrode fingers 483 that extend from the support beam portion 482 to both sides in the Y-axis direction.

Such a first fixed electrode portion 48, as illustrated in FIG. 6, is electrically connected to the wiring 721 via a conductive bump B2 in the fixed portion 481. The wiring 721 is arranged opposite so as to overlap the support beam portion 482 on the bottom surface of the concave portion 21 of the base substrate 2. In so doing, for example, it is possible to reduce the formation of unnecessary electrostatic capacitance between the movable electrode portion 42 and the wiring 721.

Each first fixed electrode finger 483 is lined up so as to have a pectinate form that meshes with the first movable electrode fingers 423 spaced with a gap, and an electrostatic capacitance C1 is formed between the facing first movable electrode fingers 423.

Meanwhile, the second fixed electrode portion 49, as illustrated in FIG. 5, includes a fixed portion 491 bonded (connected) and fixed to the base substrate 2, a support beam portion 492 that extends in the −X-axis direction from the fixed portion 491 passing between the second movable electrode fingers 424 lined up in the Y-axis direction, and a plurality of second fixed electrode fingers 493 that extend from the support beam portion 492 to both sides in the Y-axis direction.

Such a second fixed electrode portion 49, as illustrated in FIG. 6, is electrically connected to the wiring 731 via a conductive bump B3 in the fixed portion 491. The wiring 731 is arranged opposite so as to overlap the support beam portion 492 on the bottom surface of the concave portion 21 of the base substrate 2. In so doing, for example, it is possible to reduce the formation of unnecessary electrostatic capacitance between the movable electrode portion 42 and the wiring 731.

Each second fixed electrode finger 493 is lined up so as to have a pectinate form that meshes with the second movable electrode fingers 424 spaced with a gap, and an electrostatic capacitance C2 is formed between the facing second movable electrode fingers 424.

The fixed portions 481 and 491 are provided in proximity to one another lined up in the X-axis direction in the vicinity of the center G of the movable electrode portion 42. The fixed portions 481 and 491 are provided with the fixing region 413a of the support portion 41 so as to be lined up in the Y-axis direction. By arranging the fixed portions 481 and 491 in this way, it is possible to arrange the fixed portions 481 and 491 and the fixing region 413a as close as possible.

As illustrated in FIG. 7, a dummy electrode D insulated from the wirings 721 and 731 is provided on the majority of the bottom surface of the concave portion 21 of the base substrate 2, and the dummy electrode D is electrically connected to the wiring 711. According to such a configuration, because it is possible to cover the majority of the bottom surface of the concave portion 21 with the dummy electrode D that has the same potential as the movable electrode portion 42, it is possible to reduce the electrostatic force generated when the silicon substrate and the base substrate 2 that become the element piece 4 are anode bonded and it is possible to effectively suppress adhering (sticking) of the silicon substrate to the base substrate 2.

Lid

The lid 3, as illustrated in FIG. 2, includes a concave portion 31 that opens to the lower side, and is bonded to the base substrate 2 so as to form an interior space S with the concave portion 31 and the concave portion 21. In the embodiment, such a lid 3 is formed with a silicon substrate. In this way, it is possible for the lid 3 and the base substrate 2 to be bonded by anode bonding. In a state where the lid 3 is bonded only to the base substrate 2, the inside of the internal space S is communicated with via the concave portions 211, 212, and 213 formed in the base substrate 2. Therefore, in the embodiment, the concave portions 211, 212, and 213 are blocked by a SiO$_2$ film 8 formed by a CVD method or the like using tetraethoxysilane (TEOS), and the interior space S is air-tightly sealed.

The physical quantity sensor 1 with the above configuration detects acceleration as follows. That is, when an acceleration in the X-axis direction is imparted on the physical quantity sensor 1, the movable electrode portion 42 is displaced in the X-axis direction while the first and second elastic portions 431 and 432 are elastically deformed based on the magnitude of the acceleration. The gap between the first movable electrode fingers 423 and the first fixed electrode fingers 483 and the gap between the second movable electrode fingers 424 and the second fixed electrode fingers 493 each change according to such displacement and the electrostatic capacitances C1 and C2 each change according to the displacement. Therefore, it is possible for the physical quantity sensor 1 to detect acceleration based on the changes in the electrostatic capacitances C1 and C2 (differential signal).

In such a physical quantity sensor 1, as described above, the first structure 4A is bonded (connected) and fixed to the base substrate 2 via a fixing region 413a positioned on the third support portion 413. By supporting the first structure 4A on the base substrate 2 at one point in this way, the first structure 4A is not easily influence by warping of the base substrate 2 due to heat or external stress. Therefore, it is possible to reduce the changes in the gap between the first fixed electrode fingers 483 and the first movable electrode fingers 423 (gap between the second fixed electrode fingers 493 and the second movable electrode finger 424) and changes in the opposing areas of the first fixed electrode fingers 483 and the first movable electrode fingers 423 (opposing areas between the second fixed electrode fingers 493 and the second movable electrode fingers 424) according to the environmental temperature. As a result, it is possible to suppress fluctuations caused by the temperature of the electrostatic capacitances C1 and C2 to be small (that is, it is possible to exhibit superior temperature characteristics), and the detection precision of acceleration is improved.

Furthermore, in the embodiment, because the fixed portions 481 and 491 of the first and second fixed electrode portions 48 and 49 and the fixing region 413a are arranged as close as possible, the first structure 4A and the second structure 4B are not easily influenced by warping to the base substrate 2 due to heat or external stress, and further the influence is also made substantially equivalent. Accordingly, it is possible to more remarkably exhibit the above effects.

Furthermore, in the embodiment, the third support portion 413 is positioned further to the center side of the base substrate 2 than the fourth support portion 414. Therefore, it is possible to bond and fix the first structure 4A at a position close to the center of the base substrate 2. Because warping of the base substrate 2 due to heat or external stress increases from the central portion of the base substrate 2 toward the edge portion, the first structure 4A is less easily influence by warping of the base substrate 2 by bonding and fixing the first structure 4A at a position close to the center of the base substrate 2.

Second Embodiment

Next, the physical quantity sensor according to the second embodiment of the invention will be described.

Figure 8:
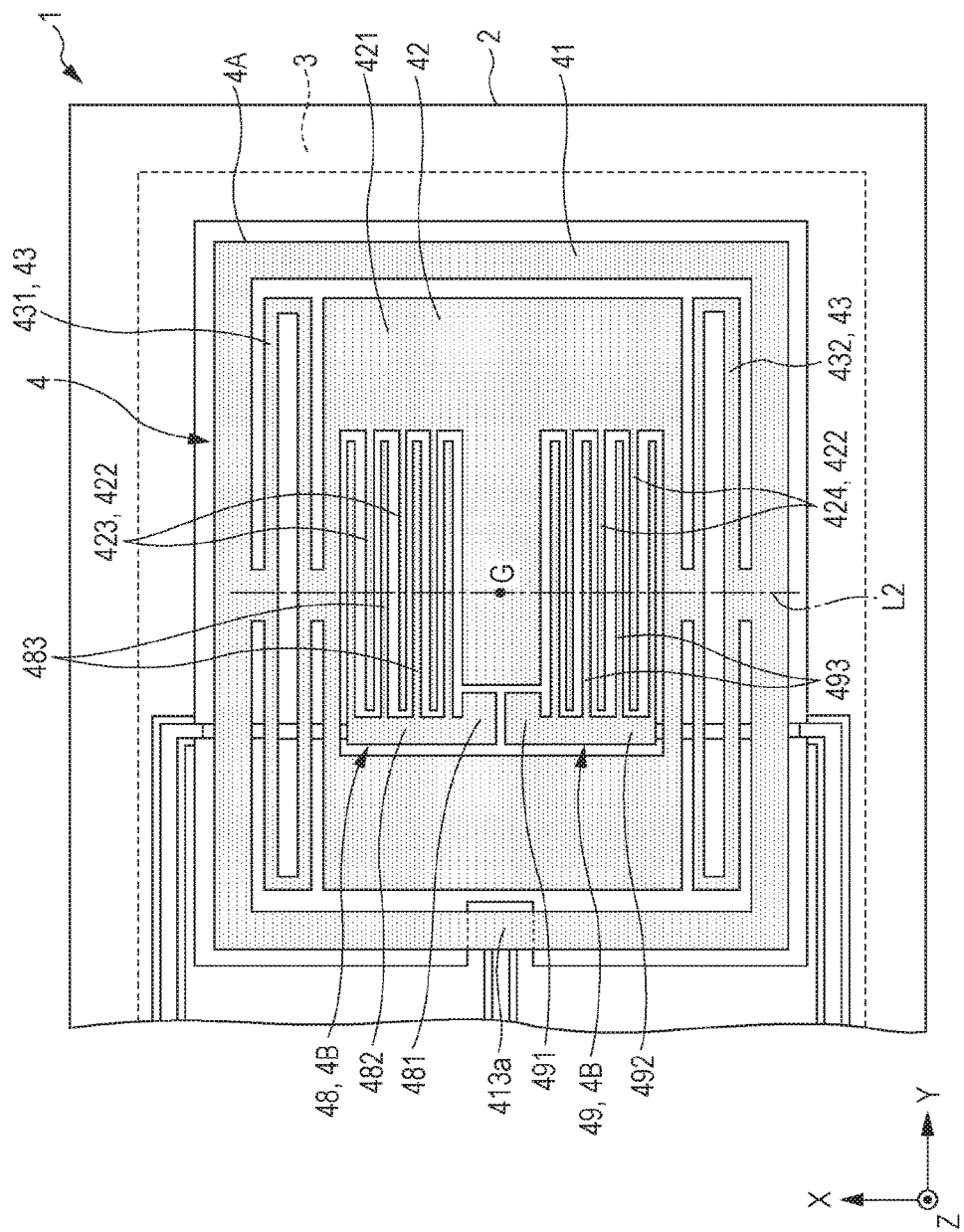
FIG. 8 is a plan view of a physical quantity sensor according to a second embodiment of the invention.

FIG. 8 is a plan view of a physical quantity sensor according to the second embodiment of the invention.

The physical quantity sensor according to the embodiment, other than differences in the configuration of the element piece, is mainly the same as the physical quantity sensor according to the above-described first embodiment.

In the following description, the physical quantity sensor of the second embodiment will be described focusing on the points of difference with the above-described embodiment and similar matters will not be described. In FIG. 8, the same reference numerals are applied to the same configurations as the embodiment described above.

In the physical quantity sensor 1 of the embodiment, as illustrated in FIG. 8, when a virtual line (second virtual line) L2 that passes through the center G of the movable electrode portion 42 and that extends along the X-axis direction in plan view is set, the fixed portions (connection portions with the base substrate 2) 481 and 491 of the first and second fixed electrode portions 48 and 49 are arranged closer to the third support portion 413 (fixing region 413a) side than the virtual line L2, in plan view. Therefore, for example, it is possible to arrange the fixed portions 481 and 491 closer to the fixing region 413a compared to the above-described first embodiment. As a result, it is possible to suppress fluctuations caused by the temperature of the electrostatic capacitances C1 and C2 to be small (that is, it is possible to exhibit superior temperature characteristics), and the detection precision of acceleration is further improved.

It is possible to also exhibit the same effects as the above-described first embodiment with the second embodiment as outlined above.

Third Embodiment

Next, the physical quantity sensor according to the third embodiment of the invention will be described.

Figure 9:
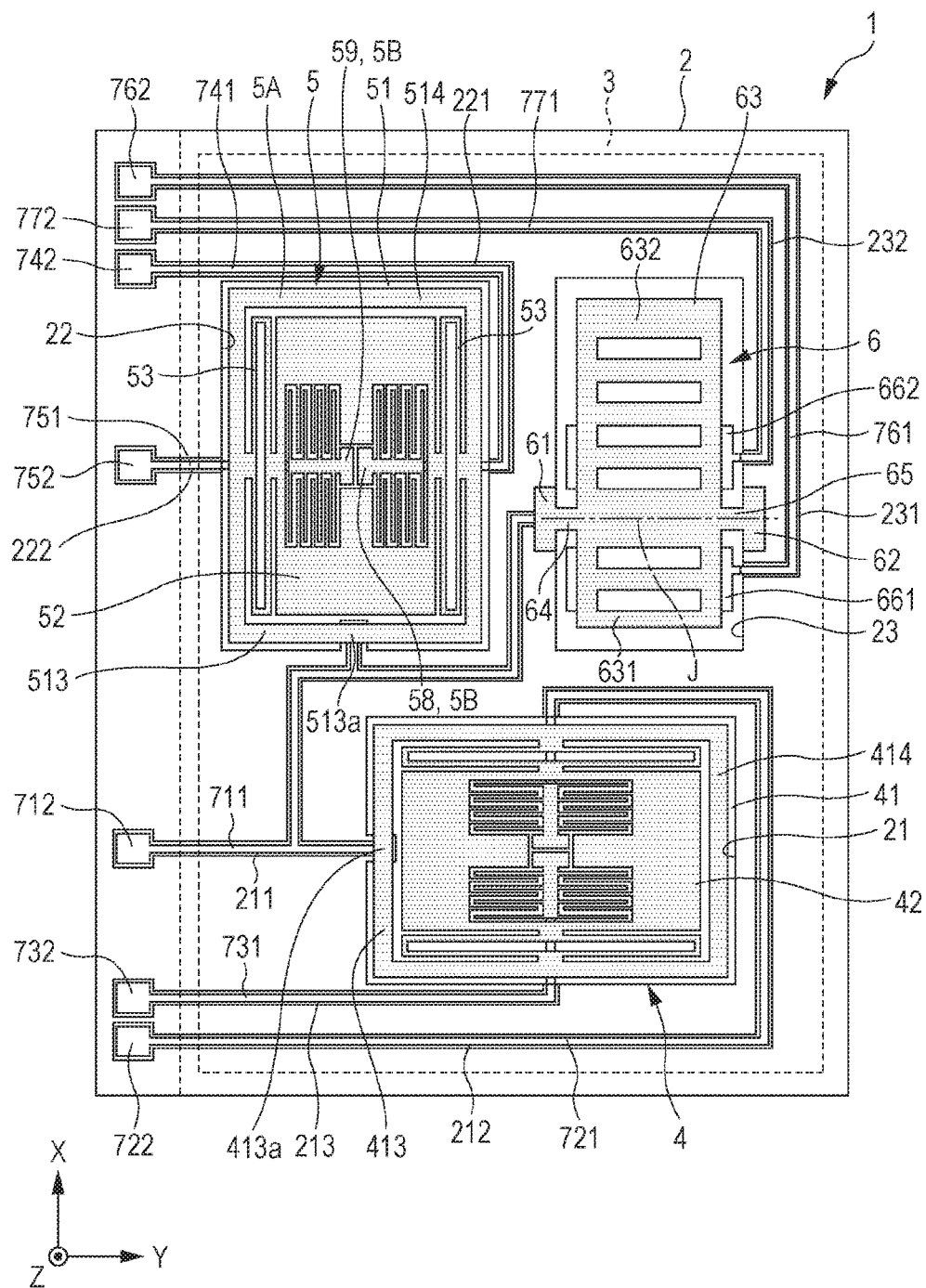
FIG. 9 is a plan view of a physical quantity sensor according to a third embodiment of the invention.

FIG. 9 is a plan view of a physical quantity sensor according to the third embodiment of the invention.

The physical quantity sensor according to the embodiment, other than a plurality of element pieces being provided, is mainly the same as the physical quantity sensor according to the above-described first embodiment.

In the following description, the physical quantity sensor of the third embodiment will be described focusing on the points of difference with the above-described embodiment and similar matters will not be described. In FIG. 9, the same reference numerals are applied to the same configurations as the embodiment described above.

The physical quantity sensor 1 of the embodiment, as illustrated in FIG. 9, can be used as a three-axis acceleration sensor that is able to measure acceleration in each of the X-axis direction, the Y-axis direction, and the Z-axis direction. Such a physical quantity sensor 1 includes a base substrate 2, a lid 3, and three element pieces 4, 5, and 6 arranged in the internal space S formed by the base substrate and the lid.

Base Substrate 2

Concave portions 21, 22, and 23 that open to the upper surface are formed in the base substrate 2. The concave portion 21 functions as an escape portion for preventing contact between the element piece 4 arranged thereabove and the base substrate 2. Similarly, the concave portion 22 functions as an escape portion for preventing contact between the element piece 5 arranged thereabove and the base substrate 2. The concave portion 23 functions as an escape portion for preventing contact between the element piece 6 arranged thereabove and the base substrate 2.

Concave portions 211, 212, and 213, concave portions 221 and 222, and concave portions 231 and 232 that open to the upper surface are formed in the base substrate 2. A wiring 711 and a terminal 712 are formed in the concave portion 211, a wiring 721 and a terminal 722 are formed in the concave portion 212, and a wiring 731 and a terminal 732 are formed in the concave portion 213. The wiring 741 and the terminal 742 are formed in the concave portion 221, and the wiring 751 and the terminal 752 are formed in the concave portion 222. The wiring 761 and the terminal 762 are formed in the concave portion 231, and the wiring 771 and the terminal 772 are formed in the concave portion 232. Each terminal 712 to 772 is arranged so as to be exposed from the lid 3.

Element Piece 4

The element piece 4 is an acceleration sensor element for detecting acceleration in the X-axis direction. Such an element piece 4 has the same configuration as the above-described first embodiment. In the element piece 4, the third support portion 413 is positioned further to the center side of the base substrate 2 than the fourth support portion 414.

Element Piece 5

The element piece 5 is an acceleration sensor element for detecting acceleration in the Y-axis direction. Such an element piece 5 has the same configuration as the element piece 4 other than being arranged to line up on the +X-axis side with respect to the element piece 4 and arranged in a state of being rotation 90° in plan view. That is, the element piece 5 includes a support portion 51, a first structure 5A provided with a movable electrode portion 52 and an elastic portion 53, and a second structure 5B provided with first and second fixed electrode portions 58 and 59. The first structure 5A is bonded and fixed to the base substrate 2 in the fixing region 513a provided in the third support portion 513 included in the support portion 51. In the element piece 5, the third support portion 513 is positioned further to the center side of the base substrate 2 than the fourth support portion 514.

The support portion 51 is electrically connected to the wiring 711 via a conductive bump, not shown, the first fixed electrode portion 58 is electrically connected to the wiring 741 via a conductive bump, not shown, and the second fixed electrode portion 59 is electrically connected to the wiring 751 via a conductive bump, not shown.

The element pieces 4 and 5 were described above. In this way, by third support portion 413 of the element piece 4 being positioned further to the center side of the base substrate 2 than the fourth support portion 414, and the third support portion 513 of the element piece 5 being positioned further to the center side of the base substrate than the fourth support portion 514, it is possible to arrange both fixing regions 413a and 513a of the element pieces 4 and 5 on the center side of the base substrate 2, and possible to arrange the fixing regions 413a and 513a as close as possible. Therefore, the element pieces 4 and 5 are less easily influenced by warping of the base substrate 2, and furthermore, the influence received is made substantially the same. Accordingly, the detection precision of acceleration is further improved.

Element Piece 6

The element piece 6 is an acceleration sensor element for detecting acceleration in the Z-axis direction (vertical direction). Such an element piece 6 includes a pair of support portions 61 and 62, a movable portion 63, and linking portions 64 and 65 that link the movable portion 63 and the support portions 61 and 62 so that the movable portion 63 is able to swing with respect to the support portions 61 and 62. The element piece 6 is configured so that the movable portion 63 swings in a see-saw manner with respect to the support portions 61 and 62 with the linking portions 64 and 65 as an axis J. Such an element piece 6 is formed from a silicon substrate doped with impurities such as phosphorous or boron.

The support portions 61 and 62 are each bonded and fixed to the upper surface of the base substrate 2 and the support portion 61 is electrically connected to the wiring 711 via a conductive bump, not shown. The movable portion includes a first movable portion 631 positioned further to the −X direction side than the axis J, and a second movable portion 632 positioned further to the +X direction side than the axis J. The first and second movable portions 631 and 632 are designed so that the rotation moments differ from one another when an acceleration in the vertical direction (Z-axis direction) is imparted and a predetermined inclination arise in the movable portion 63 according to the acceleration. Therefore, when an acceleration in the vertical direction occurs in the physical quantity sensor 1, the movable portion 63 swings in a see-saw matter around the axis J.

A first detection electrode 661 that faces the first movable portion 631 and is electrically connected to the wiring 761 and a second detection electrode 662 that faces the second movable portion 632 and is electrically connected to the wiring 771 are provided on the bottom surface of the concave portion 23. An electrostatic capacitance Ca is formed between the first movable portion 631 and the first detection electrode 661, and an electrostatic capacitance Cb is formed between the second movable portion 632 and the second detection electrode 662.

Such an element piece 6 detects the acceleration in the Z-axis direction as follows. That is, when an acceleration in the vertical direction is imparted on the physical quantity sensor 1, the movable portion 63 swings in a see-saw matter around the axis J. The separation distance between the first movable portion 631 and the first detection electrode 661 and the separation distance between the second movable portion 632 and the second detection electrode 662 change according to the see-saw swinging of the movable portion 63, and the electrostatic capacitances Ca and Cb change according thereto. Therefore, it is possible to detect acceleration based on the amount of change (differential signal) between the electrostatic capacitances Ca and Cb.

It is possible to also exhibit the same effects as the above-described first embodiment with the third embodiment as outlined above.

Fourth Embodiment

Next, the physical quantity sensor according to the fourth embodiment of the invention will be described.

Figure 10:
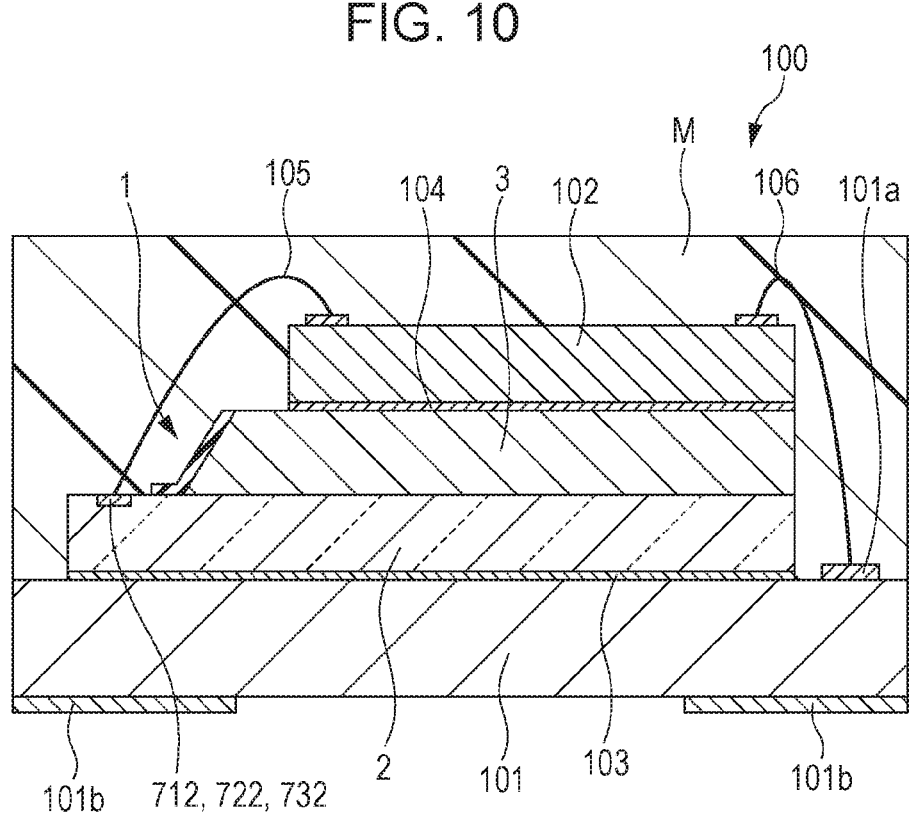
FIG. 10 is a cross-sectional view illustrating a physical quantity sensor device according to a fourth embodiment of the invention.

FIG. 10 is a cross-sectional view illustrating a physical quantity sensor device according to a fourth embodiment of the invention.

The physical quantity sensor device 100 illustrated in FIG. 10 includes a substrate 101, the physical quantity sensor 1 fixed to the upper surface of the substrate 101 via an adhesive layer 103, and an IC chip (electronic component) 102 fixed to the upper surface of the physical quantity sensor 1 via an adhesive layer 104. The physical quantity sensor 1 and the IC chip 102 are molded by a molding material M in a state where the lower surface of the substrate 101 is exposed. It is possible to use, for example, solder, a silver paste, a resin-based adhesive (die attach chemical) or the like as the adhesive layers 103 and 104. It is possible to use a heat-curable epoxy resin as the molding material M, and, for example, it is possible to perform molding with a transfer mold method.

A plurality of terminals 101a are arranged on the upper surface of the substrate 101, and a plurality of mounting terminals 101b connected to the terminals 101a via internal wirings or the like, not shown, are arranged on the lower surface. Although not particularly limited, it is possible to use a silicon substrate, a ceramic substrate, a resin substrate, a glass substrate, a glass epoxy substrate or the like as the substrate 101.

For example, a driving circuit for driving the physical quantity sensor 1, a detection circuit that detects the acceleration from the differential signal, an output circuit that outputs the signal from the detection circuit while converting to a predetermined signal, and the like are included in the IC chip 102. The IC chip 102 is electrically connected to the terminals 712, 722, and 732 of the physical quantity sensor 1 via a bonding wire 105, and electrically connected to the terminal 101a of the substrate 101 via a bonding wire 106.

Such a physical quantity sensor device 100 has superior reliability since the physical quantity sensor 1 is provided.

Fifth Embodiment

Next, an electronic apparatus according to the fifth embodiment of the invention will be described.

Figure 11:
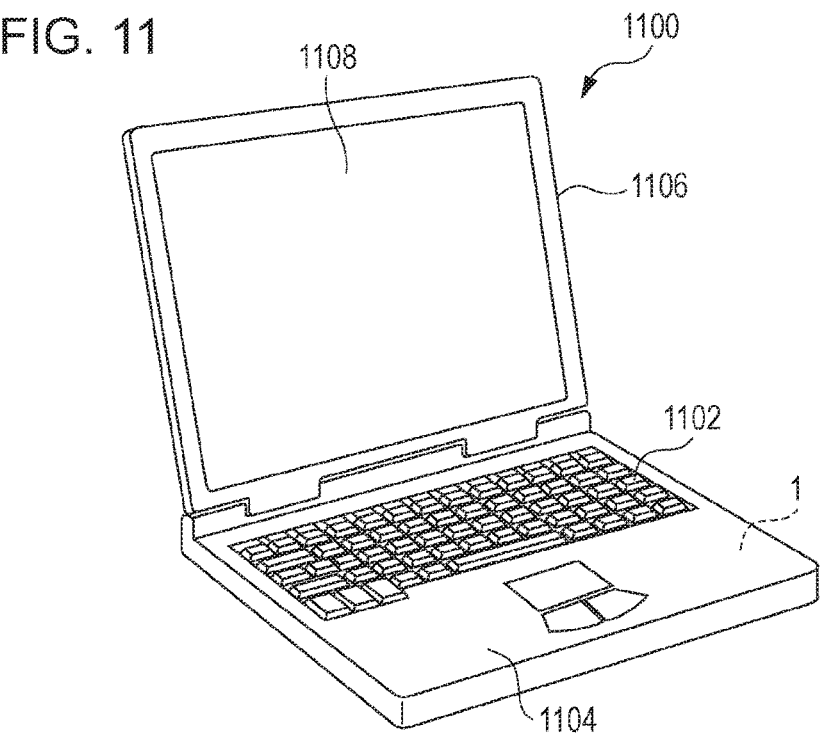
FIG. 11 is a perspective view illustrating a configuration of a mobile type (or a notebook-type) personal computer to which the electronic apparatus of the invention is applied.

FIG. 11 is a perspective view illustrating a configuration of a mobile type (or a notebook-type) personal computer to which the electronic apparatus of the invention is applied.

In the drawing, a personal computer 1100 is configured by a main body portion 1104 provided with a keyboard 1102, and a display unit 1106 provided with a display section 1108, and the display unit 1106 is supported to be able to rotate with respect to the main body portion 1104 via a hinge structure unit. The physical quantity sensor 1 that functions as an acceleration sensor is built into the personal computer 1100.

Figure 12:
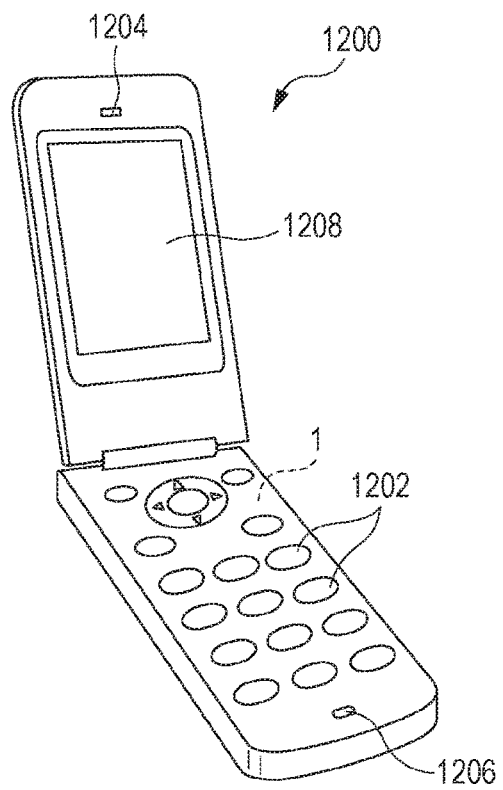
FIG. 12 is a perspective view illustrating a configuration of a mobile telephone (including a PHS) to which the electronic apparatus of the invention is applied.

FIG. 12 is a perspective view illustrating the configuration of a mobile telephone (including a PHS) to which the electronic apparatus of the invention is applied.

In the drawing, the mobile telephone 1200 is provided with an antenna (not shown), a plurality of operation buttons 1202, an ear piece 1204, and a mouthpiece 1206, and a display section 1208 is arranged between the operation buttons 1202 and the ear piece 1204. The physical quantity sensor 1 that functions as an acceleration sensor is built into the mobile telephone 1200.

Figure 13:
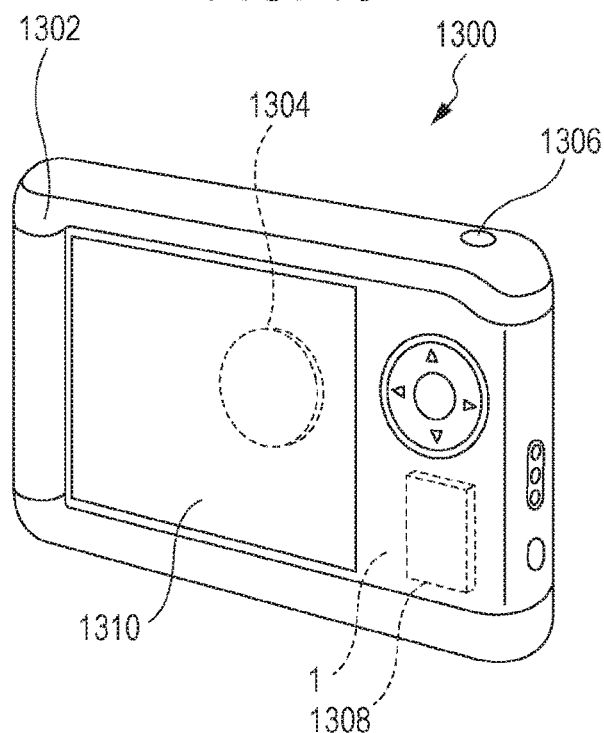
FIG. 13 is a perspective view illustrating a configuration of a digital still camera to which the electronic apparatus of the invention is applied.

FIG. 13 is a perspective view illustrating a configuration of a digital still camera to which the electronic apparatus of the invention is applied.

A display section 1310 is provided on the rear surface of the case (body) 1302 of the digital still camera 1300 and is configured to perform display based on the imaging signal by the CCD, and the display section 1310 functions as a viewfinder that displays a subject as an electronic image. A light receiving unit 1304 that includes an optical lens (imaging optical system), CCD or the like is provided on the front surface side (in the drawing, rear surface side) of the case 1302. The photographer verifies the subject image displayed on the display section 1310, and when the shutter button 1306 is depressed, the imaging signal of the CCD at this point in time is transferred to and stored in the memory 1308. The physical quantity sensor 1 used as an acceleration sensor in hand shake correction is built into the digital still camera 1300.

Such an electronic apparatus has superior reliability since the physical quantity sensor 1 is provided.

It is possible for the electronic apparatus of the invention to be applied to smartphones, tablet terminals, timepieces, ink jet discharge devices (for example, an ink jet printer), laptop-type personal computers, televisions, video cameras, video tape recorders, car navigation systems, pagers, electronic organizers (including those with a communication function), electronic dictionaries, calculators, electronic game machines, word processors, workstations, videophones, television monitors for security, electronic binoculars, POS terminals, medical equipment (for example, electronic thermometers, blood pressure monitors, blood glucose meters, electrocardiograph devices, ultrasonic diagnostic devices, and endoscopic display devices), fishfinders, various measurement apparatuses, meters, (for example, instruments for vehicles, aircraft, and ships), and flight simulators and the like, in addition to the personal computer (mobile personal computer) in FIG. 11, the mobile telephone in FIG. 12 and the digital still camera in FIG. 13.

Sixth Embodiment

Next, a moving object according to the sixth embodiment of the invention will be described.

Figure 14:
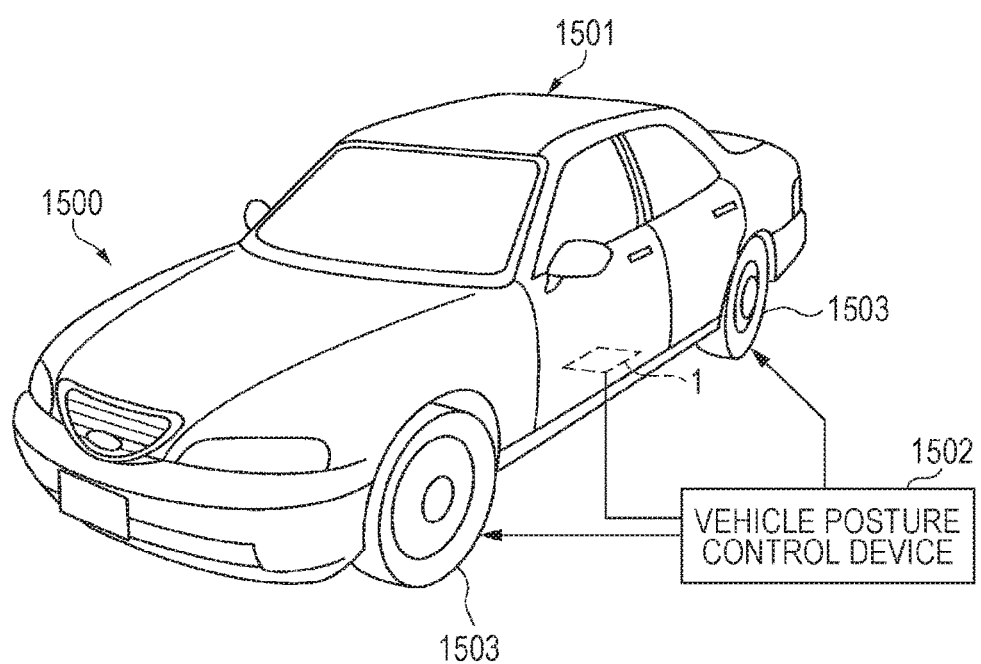
FIG. 14 is a perspective view illustrating an automobile to which the moving object of the invention is applied.

FIG. 14 is a perspective view illustrating an automobile to which the moving object of the invention is applied.

As illustrated in FIG. 14, the physical quantity sensor 1 is built into the automobile 1500, and for example, and it is possible to detect the posture of the wheel 1501 with the physical quantity sensor 1. The detection signal of the physical quantity sensor 1 is supplied to the wheel posture control device 1502, the wheel posture control device 1502 detects the posture of the wheel 1501 based on the signal, and it is possible to control the softness of the suspension according to the detection results or to control the braking of the individual wheels 1503. It is possible additionally to widely apply the physical quantity sensor 1 to an electronic control units (ECU) such as keyless entry, an immobilizer, a car navigation system, car air conditioning, an anti-lock braking system (ABS), an air bag, a tire pressure monitoring system (TPMS), an engine controller, and a battery monitor for a hybrid automobile or an electric automobile.

Although the physical quantity sensor, physical quantity sensor device, electronic apparatus, and moving object of the invention were described above based on the embodiments of the drawings; the invention is not limited thereto and it is possible for the configuration of each part to be substituted with an arbitrary configuration having the same function. Other arbitrary configurations may be added to the invention.

The entire disclosure of Japanese Patent Application No. 2015-138480, filed Jul. 10, 2015 is expressly incorporated by reference herein.

What is claimed is:

1. A physical quantity sensor, comprising:
a substrate that is rectangular-shaped and that has a recess and a ledge, the ledge surrounding the recess in a plan view; and
an element piece that is movably bonded to the substrate, the element piece being configured with:
a support member that is rectangular-ring-shaped and that is located directly adjacent to a periphery of the recess in the plan view, the support member being configured with first, second, third, and fourth side bars connected to each other, the first and second side bars being opposite to each other and extending in a first direction, the third and fourth side bars being opposite to each other and extending in a second direction perpendicular to the first direction, the third side bar being bonded to the ledge of the substrate so that the element piece is movably supported by the support member;

a first elastic member that is provided directly adjacent to the first side bar and that is elastically connected to part of the first side bar;

a second elastic member that is provided directly adjacent to the second side bar and that is elastically connected to part of the second side bar;

a movable electrode that is surrounded by the first and second elastic members, the third side bar, and the fourth side bar in the plan view, the movable electrode being movably connected to the support member via the first and second elastic members, the movable electrode having a plurality of movable electrode fingers that extend along the first direction; and a fixed electrode that is surrounded by the movable electrode in the plan view, the fixed electrode being connected to the substrate at a first area of the recess, the fixed electrode having a plurality of fixed electrode fingers that extend along the first direction, side surfaces of the plurality of movable electrode fingers facing side surfaces of the plurality of fixed electrode fingers in the second direction.

2. The physical quantity sensor according to claim 1, wherein the third side bar is positioned further to a center of the substrate than the fourth portion side bar.

3. A physical quantity sensor device, comprising:
the physical quantity sensor according to claim 2; and
an IC chip that is assembled with the physical quantity sensor and that is electrically connected to the physical quantity sensor.

4. The physical quantity sensor according to claim 2, wherein only a midpoint area of the third side bar in the second direction is bonded to the ledge of the substrate.

5. The physical quantity sensor according to claim 2, wherein a connection part of the third side bar is connected to the ledge of the substrate,
the first area of the recess to which the fixed electrode is connected and the connection part are on a first virtual linear line in the plan view, and
the first virtual linear line extends in the first direction.

6. The physical quantity sensor according to claim 2, wherein the center area of the recess to which the fixed electrode is connected is shifted toward the third side bar from a center of the movable electrode in the plan view.

7. The physical quantity sensor according to claim 1, wherein only a midpoint area of the third side bar in the second direction is bonded to the ledge of the substrate.

8. The physical quantity sensor according to claim 7, wherein the first area of the recess and the midpoint area are on a first virtual linear line in the plan view, and the first virtual linear line extends in the first direction.

9. The physical quantity sensor according to claim 8, wherein the first area of the recess to which the fixed electrode is connected is shifted toward the third side bar from a center of the recess in the plan view.

10. A physical quantity sensor device, comprising:
the physical quantity sensor according to claim 7; and
an IC chip that is assembled with the physical quantity sensor and that is electrically connected to the physical quantity sensor.

11. The physical quantity sensor according to claim 7, wherein the first area of the recess to which the fixed electrode is connected is shifted toward the third side bar from a center of the recess in the plan view.

12. The physical quantity sensor according to claim 1, wherein the first area of the recess to which the fixed electrode is connected is shifted toward the third side bar from a center of the recess in the plan view.

13. The physical quantity sensor according to claim 12, wherein only a midpoint area of the third side bar in the second direction is bonded to the ledge of the substrate.

14. The physical quantity sensor according to claim 12, wherein a connection part of the third bar is connected to the ledge of the substrate,
the first area of the recess to which the fixed electrode is connected and the connection part are on a first virtual linear line in the plan view, and
the first virtual linear line extends in the first direction.

15. A physical quantity sensor device, comprising:
the physical quantity sensor according to claim 1; and
an IC chip that is assembled with the physical quantity sensor and that is electrically connected to the physical quantity sensor.

16. An electronic apparatus, comprising:
the physical quantity sensor according to claim 1;
a display; and
a case that encloses the physical quantity sensor and the display.

17. A moving object, comprising:
the physical quantity sensor according to claim 1; and
a movable body that encloses the physical quantity sensor.

18. The physical quantity sensor according to claim 1, wherein a connection part of the third side bar is connected to the ledge of the substrate,
the first area of the recess to which the fixed electrode is connected and the connection part are on a first virtual linear line in the plan view, and
the first virtual linear line extends in the first direction.

19. The physical quantity sensor according to claim 18, wherein the first area of the recess to which the fixed electrode is connected is shifted toward the third side bar from a center of the recess in the plan view.

* * * * *